Figure 1:
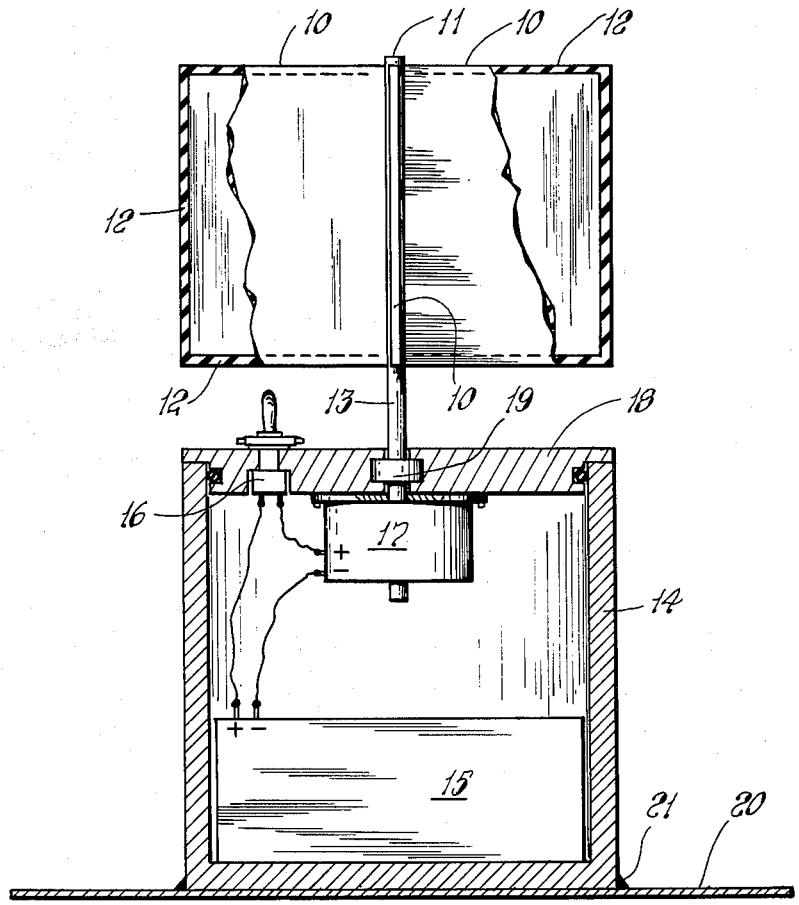

June 28, 1966     R. J. CIAVAGLIA     3,258,737
SILENT UNDERWATER BEACON

Filed Nov. 7, 1963     2 Sheets-Sheet 1

INVENTOR.
RODOLPH J. CIAVAGLIA
BY Ernest J Weinberger
Max L. Farmer
ATTORNEYS

June 28, 1966 R. J. CIAVAGLIA 3,258,737
SILENT UNDERWATER BEACON

Filed Nov. 7, 1963 2 Sheets-Sheet 2

INVENTOR.
RODOLPH J. CIAVAGLIA
BY Ernest J Weinberger
Max R Farmer
ATTORNEYS

United States Patent Office 3,258,737
Patented June 28, 1966

3,258,737
SILENT UNDERWATER BEACON
Rodolph J. Ciavaglia, Quaker Hill, Conn., assignor to the United States of America as represented by the Secretary of the Navy
Filed Nov. 7, 1963, Ser. No. 322,258
6 Claims. (Cl. 340—3)

The invention described herein may be manufactured and used by or for the Government of the United States of America for governmental purposes without the payment of any royalties thereon or therefor.

This invention relates to underwater beacons and markers and more particularly to silent beacons as aids to navigation and location of preselected submerged points and areas. Additionally, it relates to the velocity measurement of sea currents.

Presently employed underwater beacons or markers are generally of either of two types, namely, those that are active and transmit or emit sound or acoustic energy into the surrounding water and those that may be considered passive and merely reflect any impinging acoustic energy. In the first case, a ship, underwater swimmer, etc. passively locates the beacon and from the intensity of received signal can be guided relative to the beacon. Furthermore, it should be noted that in these active beacons it is necessary under most conditions, that their transmission be omnidirectional and therefore requires additional energy. The second situation, however, demands that the beacon be distinguishable from other reflecting bodies in its vicinity since it could not otherwise perform its intended purpose. The environment of the ocean is continually in a state of flux so that the area around the passive beacon when it was initially submerged may have been drastically altered by the time it is actually used for navigation. Additional problems of multiple reflections, boundary layers, etc. also tend to detract from the accuracy of these passive beacons.

These passive beacons do, however, offer a certain distinct advantage and this resides in the fact that they are difficult to detect especially where swimmers are concerned who are not aware of their existence. The advantages and disadvantages generally nullify one another and therefore most beacons presently in operation are of the active type. If, however, the covertness of the passive beacon could be combined with the readily identifiable property of the active type the resulting beacon would be used extensively.

Past techniques and apparatus for the measurement of sea currents and in particular their velocities, have required the use of connecting cables and structure between the submerged measuring device and the ocean surface. This arrangement has limited the usefulness of the apparatus and introduced factors which adversely affect the accuracy of the data obtained therefrom. It is therefore an object of this invention to provide a simple, inexpensive, reliable underwater silent acoustic beacon which is readily identifiable by those intending to employ the same, while undetectable by a passive acoustic system.

Another object is to provide a simple, expedient method and apparatus for the remote measurement of sea current velocities.

A further object is to provide a silent self-contained, underwater beacon capable of long sustained life and operable without any associated source of power.

Other objects and advantages will appear from the following description of an example of the invention, and the novel features will be particularly pointed out in the appended claims.

Figure 2:
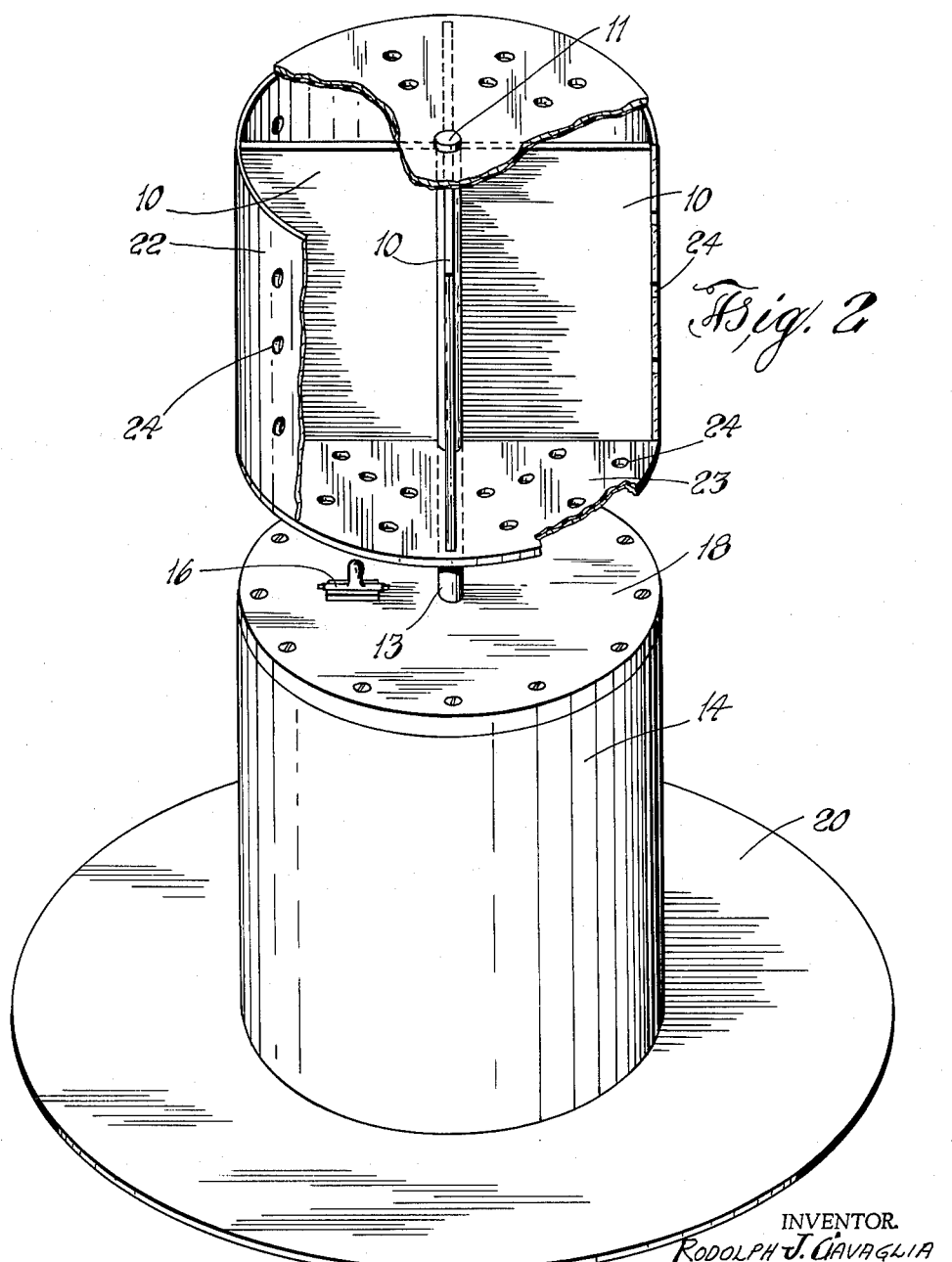

In the accompanying drawings:
FIG. 1 is a cross-sectional view of an embodiment made in accordance with the principle of this invention, and
FIG. 2 is a pictorial representation of another embodiment.

In the embodiment of the invention illustrated in FIG. 1 a plurality, in this case four, of flat disc-like vanes 10 are supported from a central shaft 11 which extends below the lower edges of the vanes. The vanes are rigidly affixed to the shaft by any convenient suitable means along one edge and extend in a plane normal to the axis. They are spaced or separated from one another and generally their planes form right angles at the shaft. They can, however, be less in number provided the angle between adjacent vanes be greater than 90°. The relation of the angular spacing between vanes will become apparent upon an explanation of the operation of the device. The vanes themselves which are employed as acoustic reflectors should therefore be capable of maximum reflection under water. In general, the boundary plane between the two media that is the water and the vanes must satisfy two conditions. In this plane there must be a continuity of pressure and of normal volume velocity. The first of these requires that the acoustical pressure of the wave in the second medium equal the acoustical pressure of the wave in the first medium, both pressures being taken immediately adjacent to the boundary plane. The second condition requires that the component of volume velocity normal to the plane with which fluid from one side approaches it must, for an infinitesimally short distance, equal the component of volume velocity normal to the plane with which on the other side moves away. Materials and coatings for this purpose are readily available and generally designated as "pressure release" substances. Although if bare metal were employed, such as the steel used as ships' hulls, the specific acoustic impedance is approximately 25 and therefore the ratio of the intensity of the incident acoustic wave to the reflected wave is 86%. This figure is satisfactory under normal conditions but where increased range or lower power are limitations, it is good practice to coat the vane surfaces with a pressure release material. Such a material 12 is shown coating all the vane surfaces including the exposed edges.

The lower end 13 of the shaft 11 extends through and into drive means casing 14 which includes therein a source of energy such as battery 15, switch 16 and an electric motor 17. The end 13 of the shaft is coupled to the motor to provide rotational motion for the vanes and passes through the removable upper cover plate 18 of the casing by way of watertight bearings 19. The plate also carries the switch 16 which is mounted with the handle exposed while the switch mechanism remains within the housing in a waterproof arrangement. The switch is wired so as to permit activation of the vanes externally and thereby conserve energy while allowing limited and selected use of the beacon.

Although the beacon may be employed at various depths in the ocean and for this purpose floats, buoyant members, etc. commonly used for this, are available, a stabilization plate 20 has been illustrated for bottom operation. The casing 14 is generally cylindrical and even though it can be of any material or contour of sufficient structural strength to withstand the operating depth of the beacon, a metallic corrosion resistant casing is preferable since also it adds weight to the beacon. Affixed to the lower face of the casing opposite the cover plate 18, as by weld 21, is the stabilization plate 20, which serves to balance the beacon in an upright position at the bottom. In most respects it will serve the same purpose when the beacon is not bottomed and can be of any suitable metal and of sufficient diameter so as to provide a stable base for the beacon.

In the embodiment illustrated in FIG. 1, the vanes are directly exposed to the surrounding ocean environment. Under these conditions, the water currents might tend to interfere with the constant angular velocity supplied by the motor or produce excessive turbulence. In order to alleviate this condition, if it should exist when the beacon is to be used, the vanes are provided with an enclosure as illustrated in FIG. 2. The enclosure 22 is a hollow cylinder of an acoustically transparent material closed at both ends having confined therein the vanes with their pressure release surfaces. An opening is provided through the lower face for passage therethrough of the shaft. The inner lower surface 23 is also covered with a suitable pressure release material so as to form a corner type reflector as required. The inner upper face might also be covered. By making the entire enclosing structure watertight, the vanes would simply need overcome the drag of the entrapped air but it should be noted that under these conditions an acoustic wave travelling toward the vanes encounters at least four interfaces (e.g. water-air, air to release material, release-air and air-water) which introduce extensive discontinuities and impedance mismatches. This situation is corrected by providing flooding holes 24 in the walls of the enclosure and making it a free flooding chamber while still preventing any ocean currents from affecting the vanes.

Having described in some detail the structural features of the embodiments of the invention, the operation and use of the beacon will now be set forth. The beacon is first placed at some location upon which it is desired to home-in on and the motor activated. The craft or swimmer is provided with a directional Doppler type sonar equipment which transmits acoustic energy at a selected frequency. When the transmitted acoustic energy is directed toward the beacon and strikes the moving vanes and is reflected thereby, the received reflected energy is then Doppler frequency shifted from the transmitted energy by an amount proportional to the velocity component of the rotating vanes. The relative motion between the vanes and the point of transmission introduces the Doppler frequency shift which is detected. By directing the movement of the craft or swimmer in the direction of the loudest or most intense audible Doppler signal, it will home-in on the beacon. Further, the Doppler equipment need only be energized long enough to take a compass bearing and continue travel along this line bearing until the beacon is reached or another bearing need be taken. This method of navigation is accurate and with limited periods of operation exceedingly difficult to detect by outsiders in addition to conserving energy.

A simple example of one use contemplated by this invention might be where it is necessary to assemble a number of underwater swimmers. First, the beacon is energized and placed in the water at the rendezvous position (also proper depth). The swimmers, all of whom carry portable Doppler equipment which is capable of detecting the Doppler shift introduced by the selected rotational velocity of the beacon vanes and having an audible output, enter the water and immediately energize their equipment in the general direction of the rendezvous point or actually search for the beacon. Since visibility is extremely limited under water, it may be necessary to make a number of fixes before reaching the beacon. In either case, each swimmer journeys in the direction of the loudest audible signal and in this way is guided quickly and accurately to his destination. Furthermore, it should be borne in mind that swimmers carry acoustic communication equipment which is easily incorporated with the Doppler circuitry, thereby reducing load to be carried.

Heretofore, the methods used for measuring sea currents have always entailed the use of cables in one form or another for the information path back to the surface of the sea. The system herein described does not use any cables for the information path. First, a beacon with rotatable vanes (by sea current) must be placed on the bottom where the current is to be measured (as FIG. 1). The vanes on this beacon could be curved and also exposed to the sea currents for rotation purposes. When the unit is down and rotating by sea currents (motor turned off), a steady-state beam of acoustic energy is transmitted in a direction toward the beacon. The reflected signal from the vanes is received at the same frequency, and detected. The signal received back would be Doppler shifted proportional to the velocity component of the rotating vanes. This shift in frequency (or beats) then would be related to sea current speed since different current speeds would produce different Doppler shifts. The shift frequency or beats would then be calibrated to read current speed in feet per seconds, thus a direct reading of sea current.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. A silent underwater homing beacon which comprises:
   (a) a free flooding housing of sound transparent material,
   (b) a plurality of perpendicular vanes supported about a common central axis disposed within said housing,
   (c) said vanes having surfaces of a sound reflecting material,
   (d) means supporting said housing and vanes for free rotation within said housing about said axis,
   ($d_1$) drive means coupled to and for rotating said vanes,
   (e) stabilizing means for orienting said housing and vanes,
   (f) whereby said beacon may be employed for homing purposes when submerged in water by the transmission of a sound energy directed at said vanes and the detection of the Doppler-shifted reflected sound energy.

2. The beacon according to claim 1, wherein said supporting means is a shaft aligned with said axis.

3. The beacon according to claim 2, wherein the inner walls of said housing perpendicular to said axis are of a sound reflecting material.

4. An underwater-silent beacon comprising:
   (a) a closed cylindrical housing of a sound transparent material having apertures therethrough extending from face to face,
   (b) a shaft extending through and coaxial with said housing having surfaces of a sound reflecting material,
   (c) a plurality of vanes disposed within and extending lengthwise of said housing,
   (d) opposite edges of each of said vanes affixed to said shaft,
   (e) a watertight housing,
   (f) a drive means disposed within said watertight housing, a portion of said shaft extending through and into said watertight housing and coupled to said drive means for rotation of said shaft thereby,
   (g) a stabilizing plate affixed to said watertight housing on a wall opposite said shaft for maintaining said beacon in an upright orientation when said plate is on the sea bottom,
   (h) whereby said beacon may be employed for homing purposes when submerged in water by the transmission of a sound energy directed at said vanes and the detection of the Doppler-shifted reflected sound energy.

5. The beacon according to claim 4, wherein the inner surface of the end of said cylindrical housing is of a sound reflecting material.

6. The method of measuring the velocity of sea currents which comprises:
 (a) disposing in said sea currents sound reflecting vanes free to be rotated thereby,
 (b) transmitting and directing sound wave energy from the sea surface against said rotating vanes,
 (c) detecting the reflected sound energy,
 (d) whereby the frequency shift between said transmitted and detected sound wave energy will be determinative of the velocity of said sea currents.

References Cited by the Examiner

UNITED STATES PATENTS

| | | | |
|---|---|---|---|
| 1,486,083 | 3/1924 | Freer | 43—17.1 |
| 2,405,281 | 8/1946 | Bemis | 340—6 X |
| 2,557,979 | 6/1951 | Labin | 343—18 X |
| 2,823,365 | 2/1958 | Rines | 340—6 |
| 2,917,740 | 12/1959 | Ramsay | 343—111 |
| 3,021,710 | 2/1962 | Barrere | 73—229 |
| 3,195,677 | 7/1965 | Hillery | 181—0.5 |

CHESTER L. JUSTUS, *Primary Examiner.*

R. A. FARLEY, *Assistant Examiner.*